United States Patent Office 2,883,422
Patented Apr. 21, 1959

2,883,422

METHOD OF PREPARING TRIFLUOROMETHYL-IMINOSULFUR DIFLUORIDES

Charles W. Tullock, Wilmington, Del., assignor to E. I. du Pont de Nemours and Company, Wilmington, Del., a corporation of Delaware No Drawing. Application April 28, 1958
Serial No. 731,113

9 Claims. (Cl. 260—543)

This invention relates to a process for preparing iminosulfur dihalides. More particularly, it relates to a process for preparing trifluoromethyliminosulfur difluoride.

Organic iminosulfur difluorides represent a new class of fluorine-containing compounds which are described in a pending and coassigned application, Serial No. 612,876, filed September 28, 1956, by William Channing Smith. These compounds are characterized by having the fluorine atoms attached to a tetravalent sulfur atom which in turn is bonded by a double bond to an imino nitrogen atom of an organic compound. An important member of this group of compounds is trifluoromethyliminosulfur difluoride whose structural formula is $CF_3$—$N$=$SF_2$.

Trifluoromethyliminosulfur difluoride is a gas at normal atmospheric temperature and pressure. It can be condensed in traps cooled with carbon dioxide-acetone solutions or liquid nitrogen to a liquid which boils at about $-5$ to $-6°$ C. The compound is a highly reactive material and is preferably stored under anhydrous conditions in containers which are resistant to chemical attack. Because of its reactivity, it is valuable as an intermediate in the preparation of other fluorine-bearing compounds. It reacts with alcohols, phenols, hydrocarbons and the like to form compounds which contain the trifluoromethyliminosulfur group. Trifluoromethyliminosulfur difluoride can be employed as a polymerization catalyst for fluoroolefins and as a source of tetrafluoroethylene, a technically important fluoroolefin. An object of this invention is, consequently, provision of a novel method for the manufacture of trifluoromethyliminosulfur difluoride.

In accordance with the above-mentioned and other objects, there is now provided a process for preparing trifluoromethyliminosulfur difluoride in good yield from available low cost materials. The process consists in reacting an inorganic thiocyanate and chlorine with a fluoride of a metal of atomic number 11 through 82 of groups I–A, I–B, II–B and IV–A of the periodic table as set forth in Deming's "General Chemistry" (John Wiley & Sons, Inc., 5th ed.), 1944.

The term "metals," as employed in this invention with respect to the fluorides, means the elements which are classified as metals in chapter 11 of Deming's textbook and in the periodic table, referred to above. The elements of groups I–A, I–B, II–B and IV–A of atomic number 11 through 82 which are classified as metals are sodium, potassium, rubidium, caesium, copper, silver, gold, zinc, cadmium, mercury, germanium, tin and lead. Examples of fluorides of metals which are operable in the process of this invention are sodium fluoride (NaF), potassium fluoride (KF), caesium fluoride (CsF), copper fluoride ($CuF_2$), silver fluoride (AgF), zinc fluoride ($ZnF_2$), mercury fluorides ($Hg_2F_2$ and $HgF_2$), tin fluorides ($SnF_2$ and $SnF_4$), and lead fluoride ($PbF_2$).

The fluorides which are preferred because of cost and availability for use in the process are the fluorides of the metals of groups I–A and II–B with atomic numbers of 11 through 80. Especially preferred are the fluorides of sodium and potassium.

Any inorganic thiocyanate stable at ordinary temperatures and pressures is operable in the process of the invention. The character of the inorganic group which is bonded to the thiocyanate radical is not critical for operability in the process since this group does not form a part of the desired end product, that is trifluoromethyliminosulfur difluoride. The preferred inorganic thiocyanates are those which are readily available at low cost, for example, ammonium thiocyanate and the thiocyanates of the alkali and alkaline earth metals. The thiocyanates of lithium, sodium, potassium, magnesium, calcium and barium, as well as ammonium, are illustrative of the thiocyanates which are well suited for use in the process. If desired, the thiocyanate can be preformed in the reaction vessel and then reacted with chlorine and a metal fluoride. Both the thiocyanate and fluoride reactants are preferably used in comminuted form to obtain the maximum rate of reaction and reduce the time required to complete the reaction.

The third component employed in the process, that is, chlorine, is a readily available commercial product.

The reactants need not be especially purified for use in the process but they should be reasonably free of moisture since trifluoromethyliminosulfur difluoride reacts with water. For maximum yield of product, it is preferable, therefore, to dry the reactants prior to use. This step in the process is not essential for operability and is used solely as a means of obtaining the highest yield of product. Mixed metal fluorides and mixed inorganic thiocyanates can be employed without adversely affecting operability. Commercial grade chemicals can be employed satisfactorily.

The reaction of the inorganic thiocyanate, metal fluoride and chlorine is conducted under substantially anhydrous conditions in either a batch or continuous flow process. In either process the reaction chamber is preferably made of material resistant to chemical attack by hydrogen fluoride, for example, stainless steel.

In a batch process a vessel capable of withstanding pressure is preferably flushed with an inert gas, for example, nitrogen, to displace the air and is then charged with the inorganic thiocyanate and the metal fluoride. The chamber is evacuated to a low pressure, for example, 10 mm. or less, and then charged with chlorine. The reaction chamber is closed and the mixture then heated at the desired temperature with suitable mechanical agitation.

The mechanism of the reaction is not clearly understood but it is obvious that the sulfur and fluorine in the final product are obtained from the inorganic thiocyanate and fluoride, respectively. The chlorine reactant is converted to a by-product inorganic chloride.

It is not essential for operability that the reactants be used in any particular ratios. However, in order to obtain maximum yield of trifluoromethyliminosulfur difluoride certain ratios of reactants are preferred. Generally the molar ratio of thiocyanate groups (SCN) to fluoride groups (F) in the reactants is not less than about 1:1 or more than about 1:20; preferably the ratio for these groups lies between 1:3 and 1:10. Sufficient chlorine is preferably used to react with substantially all of the inorganic cations present. Lower quantities of chlorine can, however, be employed without affecting operability since unreacted components can be recovered and reused.

The temperature of the reaction is kept as low as operability permits. It will generally lie between about 50° and 500° C. The preferred temperature range for optimum yield lies between about 150° and 400° C. Excessively high temperatures are not necessary and provide little or no advantage in economy of operation or yield of desired product.

Heating of the reactants can be accomplished by a stepwise procedure wherein the reactants are maintained for short periods of time at progressively higher temperatures. This procedure permits smooth operation of the process and avoids sudden increases in pressure in the reaction vessel. However, this procedure is not essential for operability. The reactants can, if desired, be heated in one step to the reaction temperature. The time of heating is generally between about 2 hours to about 48 hours.

The pressure employed in a batch process is generally autogenous and can be between about 5 atmospheres and 50 atmospheres. During the reaction period, the contents of the vessel are preferably mixed, for example, by mechanical stirring or shaking.

The process of the invention can also be conducted by a continuous flow method wherein, for example, a mixture of thiocyanate and fluoride is placed in a tube of corrosion resistant material and chlorine gas passed over the mixture as it is heated to the desired reaction temperature. The volatile trifluoromethyliminosulfur difluoride can be collected in traps cooled with, for example, solid carbon dioxide-acetone solution or liquid nitrogen. A continuous process is usually operated at atmospheric pressure although it can be operated at pressures that are higher or lower than atmospheric.

Trifluoromethyliminosulfur difluoride can be collected, as described previously, in corrosion-resistant traps or pressure vessels which are cooled by any suitable means to a temperature of about −20° C. or lower. The crude product can be purified by distillation through a conventional low temperature fractionation unit. The pure product boils at approximately −5° to −6° C. but fractions boiling between about −3° to −8° C. are substantially pure.

The following examples, in which quantities are expressed as parts by weight, illustrate the process of this invention. In each of the examples, a vessel is used which is lined with "Hastelloy" C and is capable of withstanding pressure. "Hastelloy" C is a well known chemically-resistant alloy of nickel, iron and molybdenum.

*Example I*

A. A pressure vessel (capacity, 1000 parts of water) is charged with 41 parts of sodium thiocyanate and 135 parts of sodium fluoride. The pressure vessel is then flushed with nitrogen, closed and evacuated to about 1 mm. pressure. It is then charged with 106 parts of chlorine gas. The vessel is heated with agitation at 75° C. for 3 hours, 150° C. for 1 hour and 235° C. for 4 hours. The pressure vessel is cooled and the volatile products are vented into a stainless steel cylinder. There is obtained 47 parts of volatile products which are distilled through a low temperature fractionation unit to yield 17 parts (about 22% yield) of trifluoromethyliminosulfur difluoride of approximately 95% purity, as determin by infrared analysis.

B. A mixture of 62 parts of sodium thiocyanate, 175 parts of sodium fluoride and 142 parts of chlorine is heated as described in part A of this Example at 75° C. for 3 hours, 150° C. for 1 hour and 235° C. for 6 hours. There is obtained 92 parts of volatile products which are distilled through a low temperature fractionation unit to yield 57 parts (about 49% yield) of trifluoromethyliminosulfur difluoride, boiling at −3° to −5° C.

*Example II*

A pressure vessel (capacity, 500 parts of water) is charged with 32 parts of potassium thiocyanate, 90 parts of sodium fluoride and 70 parts of chlorine as described in Example I. The reactants are heated with agitation at 150° C. for 1 hour and 235° C. for 4 hours. There is obtained 36 parts of volatile products which are shown by infrared analysis to contain, on a molar basis, 60% of trifluoromethyliminosulfur difluoride. The yield of desired product, based on potassium thiocyanate, is approximately 50%.

*Example III*

A pressure vessel (capacity, 500 parts of water) is charged with 25 parts of calcium thiocyanate, 90 parts of sodium fluoride and 68 parts of chlorine as described in Example I. The reactants are heated with agitation at 75° C. for 1 hour, 150° C. for 1 hour, and 235° C. for 6 hours. There is obtained 13 parts of volatile products which are shown by infrared analysis to contain a substantial quantity (more than 50%) of trifluoromethyliminosulfur difluoride.

Examples I through III illustrate the process of the invention using the thiocyanates of the alkali and alkaline earth metals, that is, the metals of groups I-A and II-A of the periodic table. However, inorganic thiocyanates broadly can be employed in the process as illustrated in Examples IV and V which follow.

*Example IV*

A pressure vessel (capacity, 200 parts of water) is charged with 7 parts of ammonium thiocyanate, 60 parts of sodium fluoride and 29 parts of chlorine as described in Example I. The reactants are heated with agitation at 75° C. for 1 hour, 150° C. for 1 hour, and 235° C. for 6 hours. There is obtained 20 parts of volatile products which are shown by infrared analysis to contain, on a molar basis, 35% of trifluoromethyliminosulfur difluoride. The yield of desired product, based on ammonium thiocyanate, is about 60%.

*Example V*

A mixture of 50 parts of lead thiocyanate, 90 parts of sodium fluoride and 66 parts of chlorine is heated as described in Example IV. There is obtained 32 parts of volatile products which are shown by infrared analysis to contain at least 50% of trifluoromethyliminosulfur difluoride.

Examples of other thiocyanates which can be employed in the process are barium thiocyanate, silicon tetrathiocyanate, copper thiocyanate, silver thiocyanate, ferric and ferrous thiocyanates, nickel thiocyanate, manganese thiocyanate, mercuric thiocyanate, mercurous thiocyanate, and zinc thiocyanate. Ammonium thiocyanate and the thiocyanates of the alkali metals and alkaline earth metals are preferred because of availability and cost.

*Example VI*

A mixture of 16 parts of potassium thiocyanate, 60 parts of potassium fluoride and 35 parts of chlorine is heated as described in Example I at 75° C. for 1 hour, 150° C. for 1 hour, and 235° C. for 6 hours. There is obtained 16 parts of volatile products which are shown by infrared analysis to contain, on a molar basis, 5–10% of trifluoromethyliminosulfur difluoride. The low yield of desired product is attributed to the relatively large particle size of the potassium fluoride and to traces of water which it retains. Potassium fluoride is a very hygroscopic material. More thorough drying of this reactant results in higher yields of trifluoromethyliminosulfur difluoride.

Examples I through VI illustrate the use in the process of fluorides of group I metals of atomic number 11 or higher. Other metal fluorides of this group which can be employed are caesium fluoride, copper fluoride and silver fluoride.

*Example VII*

A mixture of 32.4 parts of sodium thiocyanate, 150 parts of zinc fluoride and 86 parts of chlorine is heated with agitation as described in Example I at 75° C. for 1 hour, 150° C. for 1 hour, and 235° C. for 6 hours. There is obtained 37 parts of volatile products which are shown by infrared analysis to contain a substantial quantity (more than 50%) of trifluoromethyliminosulfur difluoride.

Example VII illustrates the process of the invention employing the fluoride of a group II–B metal. Fluorides of metals of group IV–A can be employed in the process as described in the examples. Thus, tin tetrafluoride and lead fluoride can be used in place of the zinc fluoride of Example VII. For example, trifluoromethyliminosulfur difluoride is obtained by heating mixtures of (a) stannic fluoride, ammonium thiocyanate and chlorine, and (b) lead fluoride, lead thiocyanate and chlorine.

Since obvious modifiications in the invention will be evident to those skilled in the chemical arts, I propose to be bound solely by the appended claims.

The embodiments of the invention in which an exclusive property or privilege is claimed are defined as follows:

1. The process for the preparation of trifluoromethyliminosulfur difluoride which comprises reacting together an inorganic thiocyanate, chlorine and a fluoride of a metal of atomic number 11–82, inclusive, selected from the metals of groups I–A, I–B, II–B and IV–A of the periodic table.

2. The invention of claim 1 wherein the inorganic thiocyanate is selected from the class consisting of the alkali and alkaline earth metal and ammonium thiocyanates.

3. The invention of claim 1 wherein the molar ratio of thiocyanate to fluoride groups in the reactants is between 1:1 and 1:20.

4. The invention of claim 3 wherein said ratio is between 1:3 and 1:10.

5. The invention of claim 1 wherein the metal fluoride is that of a metal of the group consisting of sodium, potassium and zinc.

6. The process for the preparation of trifluoromethyliminosulfur difluoride which comprises reacting together sodium thiocyanate, chlorine and a fluoride of a metal of atomic number 11–82, inclusive, selected from the metals of groups I–A, I–B, II–B and IV–A of the periodic table.

7. The process for the preparation of trifluoromethyliminosulfur difluoride which comprises reacting together potassium thiocyanate, chlorine and a fluoride of a metal of atomic number 11–82, inclusive, selected from the metals of group I–A, I–B, II–B and IV–A of the periodic table.

8. The process for the preparation of trifluoromethyliminosulfur difluoride which comprises reacting together ammonium thiocyanate, chlorine and a fluoride of a metal of atomic number 11–82, inclusive, selected from the metals of groups I–A, I–B, II–B and IV–A of the periodic table.

9. The process for the preparation of trifluoromethyliminosulfur difluoride which comprises reacting together lead thiocyanate, chlorine and a fluoride of a metal of atomic number 11–82, inclusive, selected from the metals of groups I–A, I–B, II–B and IV–A of the periodic table.

No references cited.